(12) United States Patent
Monro et al.

(10) Patent No.: US 9,043,691 B2
(45) Date of Patent: May 26, 2015

(54) METHOD AND APPARATUS FOR EDITING MEDIA

(75) Inventors: James Monro, Vancouver (CA); Eric Bridgwater, New Westminster (CA); Brent Hilpert, Port Moody (CA)

(73) Assignee: James Monro Productions Inc., Vancouver, BC (CA)

( * ) Notice: Subject to any disclaimer, the term of this patent is extended or adjusted under 35 U.S.C. 154(b) by 1202 days.

(21) Appl. No.: 11/817,251

(22) PCT Filed: Feb. 28, 2006

(86) PCT No.: PCT/CA2006/000297
§ 371 (c)(1),
(2), (4) Date: May 13, 2008

(87) PCT Pub. No.: WO2006/089433
PCT Pub. Date: Aug. 31, 2006

(65) Prior Publication Data
US 2009/0113279 A1    Apr. 30, 2009

Related U.S. Application Data

(60) Provisional application No. 60/656,403, filed on Feb. 28, 2005.

(51) Int. Cl.
*G11B 27/34* (2006.01)
*G11B 27/034* (2006.01)
*G10L 13/04* (2013.01)

(52) U.S. Cl.
CPC ............ *G11B 27/034* (2013.01); *G10L 13/043* (2013.01)

(58) Field of Classification Search
CPC ............................ G10L 13/043; G11B 27/034
USPC ................... 715/201, 202, 203, 205, 201.202
See application file for complete search history.

(56) References Cited

U.S. PATENT DOCUMENTS

| | | | | |
|---|---|---|---|---|
| 5,388,197 A | * | 2/1995 | Rayner | 715/723 |
| 5,627,765 A | * | 5/1997 | Robotham et al. | 708/203 |
| 5,659,793 A | * | 8/1997 | Escobar et al. | 715/202 |
| 5,732,184 A | * | 3/1998 | Chao et al. | 386/282 |
| 5,760,767 A | * | 6/1998 | Shore et al. | 715/723 |

(Continued)

FOREIGN PATENT DOCUMENTS

| CA | 2257577 C | 10/1998 |
|---|---|---|
| CA | 2380410 A1 | 2/2001 |

(Continued)

OTHER PUBLICATIONS

International Search Report for PCT App. No. PCT/CA2006/000297 mailed Jun. 13, 2006.

(Continued)

*Primary Examiner* — Stephen Hong
*Assistant Examiner* — Marshon Robinson

(57) ABSTRACT

A system for editing a multi-media narrative is provided, including an authoring application for inserting a media element within the multi-media narrative; said authoring application executable within a browser; said media element stored within a cache of said browser, inaccessible to a user of said browser; a database on a server for storage of said media element and said multi-media narrative; and a text to speech converter for converting text input by the user into a media element.

21 Claims, 8 Drawing Sheets

(56) References Cited

U.S. PATENT DOCUMENTS

| | | | |
|---|---|---|---|
| 5,802,299 A | 9/1998 | Logan et al. | |
| 6,052,717 A | 4/2000 | Reynolds et al. | |
| 6,061,696 A * | 5/2000 | Lee et al. | 715/209 |
| 6,314,492 B1 | 11/2001 | Allen et al. | |
| 6,345,279 B1 * | 2/2002 | Li et al. | 1/1 |
| 6,397,217 B1 * | 5/2002 | Melbin | 1/1 |
| 6,400,378 B1 * | 6/2002 | Snook | 715/716 |
| 6,411,993 B1 | 6/2002 | Reynolds et al. | |
| 6,544,293 B1 | 4/2003 | Ohanian | |
| 6,573,898 B1 | 6/2003 | Mathur et al. | |
| 6,721,788 B2 | 4/2004 | Reynolds et al. | |
| 6,771,285 B1 * | 8/2004 | McGrath et al. | 715/723 |
| 6,807,572 B1 | 10/2004 | Yu | |
| 6,816,904 B1 | 11/2004 | Ludwig et al. | |
| 6,904,561 B1 * | 6/2005 | Faraday et al. | 715/202 |
| 6,954,894 B1 * | 10/2005 | Balnaves et al. | 715/202 |
| 7,290,057 B2 * | 10/2007 | Saunders et al. | 709/231 |
| 7,325,199 B1 * | 1/2008 | Reid | 715/723 |
| 7,552,338 B1 * | 6/2009 | Swildens et al. | 713/176 |
| 7,752,548 B2 * | 7/2010 | Mercer | 715/731 |
| 2001/0014839 A1 | 8/2001 | Belanger et al. | |
| 2001/0020244 A1 | 9/2001 | Belanger et al. | |
| 2002/0026507 A1 * | 2/2002 | Sears et al. | 709/224 |
| 2002/0046245 A1 * | 4/2002 | Hillar et al. | 709/205 |
| 2002/0055880 A1 * | 5/2002 | Unold et al. | 705/26 |
| 2002/0059402 A1 | 5/2002 | Belanger | |
| 2002/0069365 A1 | 6/2002 | Howard et al. | |
| 2002/0078093 A1 | 6/2002 | Samaniego et al. | |
| 2002/0078102 A1 * | 6/2002 | Dutta | 707/526 |
| 2002/0104096 A1 * | 8/2002 | Cramer et al. | 725/113 |
| 2002/0124048 A1 * | 9/2002 | Zhou | 709/203 |
| 2002/0124100 A1 * | 9/2002 | Adams | 709/232 |
| 2002/0196327 A1 * | 12/2002 | Rui et al. | 348/14.11 |
| 2003/0033331 A1 | 2/2003 | Sena et al. | |
| 2003/0115598 A1 * | 6/2003 | Pantoja | 725/40 |
| 2003/0124502 A1 | 7/2003 | Chou | |
| 2003/0158969 A1 | 8/2003 | Gimson et al. | |
| 2003/0221167 A1 * | 11/2003 | Goldstein et al. | 715/513 |
| 2003/0229855 A1 | 12/2003 | Gorelov et al. | |
| 2004/0039834 A1 * | 2/2004 | Saunders et al. | 709/231 |
| 2004/0039934 A1 * | 2/2004 | Land et al. | 713/200 |
| 2004/0109137 A1 * | 6/2004 | Bubie et al. | 352/40 |
| 2004/0117822 A1 | 6/2004 | Karaoguz et al. | |
| 2004/0205116 A1 | 10/2004 | Pulier et al. | |
| 2005/0193322 A1 * | 9/2005 | Lamkin et al. | 715/500.1 |
| 2005/0193341 A1 * | 9/2005 | Hayward et al. | 715/716 |
| 2005/0210396 A1 * | 9/2005 | Galli | 715/758 |
| 2005/0251749 A1 * | 11/2005 | Lamkin et al. | 715/719 |
| 2006/0064644 A1 * | 3/2006 | Joo | 715/751 |
| 2007/0106940 A1 * | 5/2007 | Angelovich | 715/727 |

FOREIGN PATENT DOCUMENTS

| | | |
|---|---|---|
| CA | 2402418 A1 | 9/2001 |
| CA | 2441120 A1 | 9/2002 |
| EP | 1376582 A2 | 6/2003 |
| EP | 1376385 A2 | 1/2004 |
| EP | 1376583 A2 | 1/2004 |
| EP | 1429535 A1 | 6/2004 |
| WO | 9821672 A2 | 5/1998 |
| WO | 9909658 A2 | 2/1999 |
| WO | 9923560 A1 | 5/1999 |
| WO | 0077663 A2 | 12/2000 |
| WO | 0118656 A1 | 3/2001 |
| WO | 0203247 A2 | 1/2002 |
| WO | 03041364 A2 | 5/2003 |
| WO | 03054687 A1 | 7/2003 |
| WO | 03069579 A2 | 8/2003 |
| WO | 03102819 A1 | 12/2003 |
| WO | 2004090900 A1 | 10/2004 |
| WO | 2004091227 A1 | 10/2004 |

OTHER PUBLICATIONS

International Preliminary Report on Patentability for PCT App. No. PCT/CA2006/000297 issued Sep. 11, 2007.

* cited by examiner

METHOD AND APPARATUS FOR EDITING MEDIA

This application claims the benefit of U.S. provisional application No. 60/656,403 filed Feb. 28, 2005.

FIELD OF THE INVENTION

This invention relates to the methods of editing multi-media narratives, such as films, and more particularly, to editing multi-media narratives stored remotely.

BACKGROUND OF THE INVENTION

Historically, film editing was completed by hand, and editors would literally cut and splice video and audiotape to form the completed product. Now, digital tools are used to complete film products and several software products such as AVID are available for such purposes.

These products allow users to select video and audio "media elements" for insertion into a finished multi-media narrative. A media element is a segment of media that can be included in the multi-media narrative, for example a visual media element may include a single take or shot of an event, or a still photograph. An audio media element may be a single sound, or maybe a word, or a conversation or music track. Media elements may be made of other media elements as well. A film is an example of a selection of visual and audio media elements ordered by the film editor into a final multi-media narrative.

The software available in the art allows a user to access locally stored media, such as video and audio media elements, to manipulate these media elements (for example, by shortening them) and selecting the order in which the media elements will be represented. Sound media elements may be added to or used in place of the default sound (if any) associated with a visual media element. A "drag and drop" system may be employed to allow users to place media elements in the desired order into the finished multi-media narrative.

A common lacking in such products is the ability to use media elements that are not stored locally. Current solutions use media elements that arrive with the product, or allow users to download media from the Internet or another source for insertion into the multi-media narrative. This results in loss of control of the media elements, in that the audio and visual media elements are stored on the user's computer, allowing the user to access such files for other purposes. In these cases the provider of the media elements loses control of the media elements, and may find them spread over the Internet or otherwise used in an inappropriate manner.

What is needed is a solution that allows users to collect audio and visual media elements through an online experience and then assemble them into a multi-media narrative with an online media element collection and use system, preferably with a text-to-speech narration generator.

BRIEF SUMMARY OF THE INVENTION

The system and method according to the invention is a media editor that allows users to manipulate and edit visual and audio media elements that are stored on a server. Thus the user can select, alter and order the media elements, but does not download the media elements to the user's computer in a form that can be used independently of the authoring application.

A media aggregator and authoring application allows users to combine text, images and video into their own multi-media narratives. The system according to the invention includes the following components:

Media Aggregator

The media aggregator is a tool for users to collect text, sound, image, video and other media elements that they encounter on certain web sites. These media elements are not saved to the user's computer, but are flagged by the media aggregator and stored on the media server. This allows access to the media elements from any computer with access to the media server, and allows for protection of copyrights, as the media element does not leave its original server other than to the cache of the authoring application in user's browser. When the user exits their browser, the cache file containing the multi-media narrative or media elements is deleted.

Authoring Application

The authoring application is an application that enables users to build multi-media narratives, such as online movies. The authoring application runs entirely from a web page in the user's browser, as the media elements, and the finished multi-media narrative, are stored on a server.

Text-to-Speech Application

A feature of the system is the use of a text-to-speech (TTS) application that enables text to be converted to an audible speech file. A user types in narration into their web page using the authoring application which then uses the TTS application to convert the text into an audio media element (with optional subtitles) which can then be dragged and dropped into the multi-media narrative. As the TTS application is hosted on the media server, voices (male, female, etc.) can be added based on the user's needs and license requirements. The TTS application allows the audio media element to be stored on the media server and replayed as often as needed as different people can view the created multi-media narrative.

Ease of Use

To operate the authoring application, users need only the skill level to drag, drop and order media elements along a story line to make their own multi-media narrative. Without installing any software on their computer (except for perhaps plug-ins), or downloading any media element, users can access a movie creation system via a web browser, assemble movies from collected media elements, generate narrative audio and save a created multi-media narrative.

A method for a user to edit a multi-media narrative is provide, including the steps of using a browser, selecting a media element on a server for inclusion in the multi-media narrative; said media element stored in a cache of said browser, inaccessible to said user; selecting a position within said multi-media narrative to position said media element; and inserting said media element within said multi-media narrative. The multi-media narrative is stored on said server, and when displayed in said browser, is stored in said cache of said browser, inaccessible to said user. The media element may be an audio media element, generated from text provided by the user.

The multi-media application, including said media element, is displayed within said browser after said media element is inserted within said multi-media narrative. The media element is selected from a list of media elements within said browser. The user selects a plurality of media elements for said list of media elements, at least a portion of said plurality of media elements stored on a second server.

A system for editing a multi-media narrative is provided, including an authoring application for inserting a media element within the multi-media narrative; said authoring application executable within a browser; said media element stored within a cache of said browser, inaccessible to a user of said browser; a database on a server for storage of said media element and said multi-media narrative; and a text to speech converter for converting text input by the user into a media element. Preferably a collection manager is used for managing a plurality of media elements, and the multi-media narrative, when played within said browser, is stored in a cache of said browser, inaccessible to the user.

DETAILED DESCRIPTION OF THE INVENTION

In this document, the following terms have the following meanings:
"browser" means a computer program used for accessing sites or information on a network (such as the World Wide Web);
"computer" means a programmable electronic device that can store, retrieve, and process data, and communicate the data to other computers;
"Internet" means an electronic communications network that connects computer networks and organizational computer facilities around the world, and includes the world wide web;
"multi-media narrative" means an ordered sequence of media elements to generate a story or narrative; and
"server" means a computer in a network that is used to provide services to other computers in the network. A server may be software running on a computer.

Figure 1:
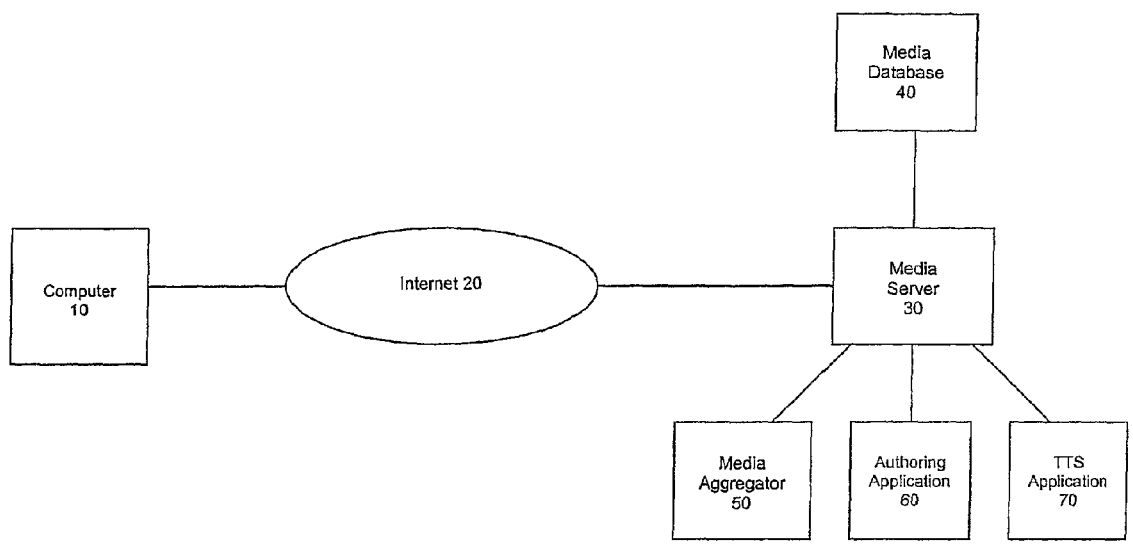
FIG. 1 is a block diagram of the overall system according to the invention.
Figure 2:
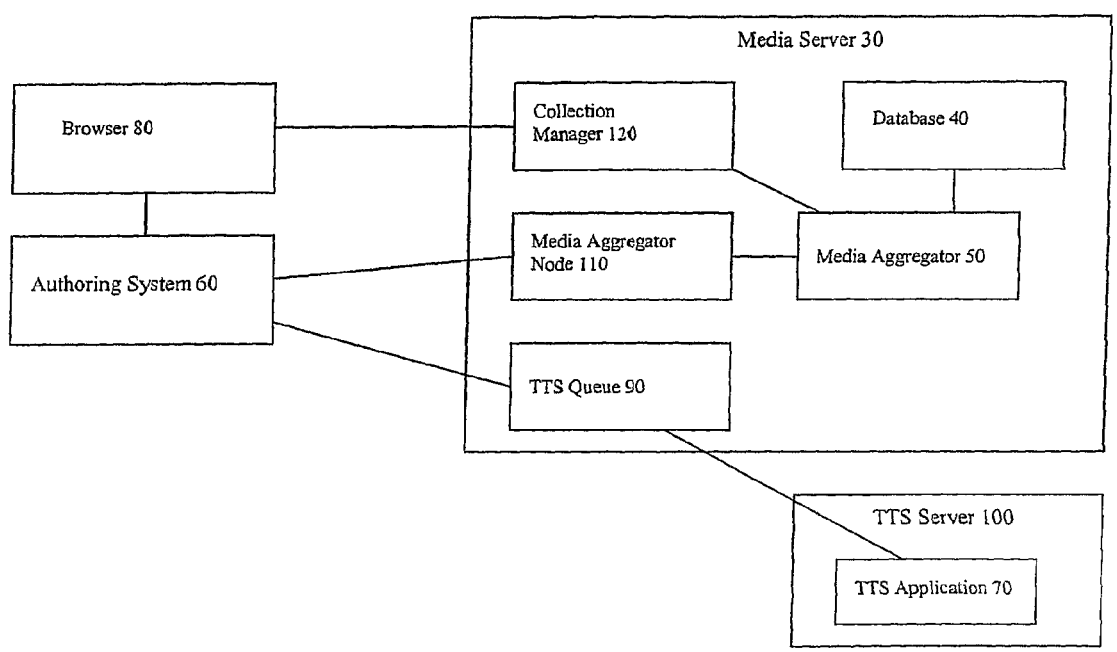
FIG. 2 is a block diagram showing the communications links between the media server and the user's computer.

As seen in FIGS. 1 and 2, in an embodiment of the invention, computer 10, operated by a user accesses the Internet 20, or another wide area network, using a software application running on computer 10, such as a browser 80. Computer 10, through the Internet, accesses media server 30. Media server 30 is a conventional server, and may be on or more computers, or software running on a computer. Media server 30 is in communication with media database 40, which is a database storing media elements, multi-media narratives and other information relating to authoring application 60 and the user.

As seen in FIG. 1, three components of media server 30 include: media aggregator 50, authoring application 60, and text-to-speech application 70. Media aggregator 50, authoring application 60, and text-to-speech application 70 are each separate, stand alone computer programs which collaborate to provide the functionality of the system according to the invention. As seen in FIG. 2, TTS application 70 may be run on a separate TTS server 100, in which case TTS queue 90 arranges for communication between media server 30 and TTS server 100. Media aggregator node 110 communicates between media aggregator 50 and authoring application 60.

Each component is described in detail below.

Authoring Application

Authoring application 60 is preferably a cross-platform application encoded using software such as Macromedia Director™ in an application such as Shockwave™. Authoring application 60 can be operated in any browser 80 (perhaps requiring a plug-in). If browser 80 does not have a necessary plug-in it may be automatically downloaded for the user's computer and authoring application 60, on supported computers, can be used immediately without restarting the browser. Alternatively, browser 80 may prompt the user using browser 80's standard plug-in detection code.

A feature of authoring application 60 is that it provides the functionality of a normal software program in a web deliverable component. Security available through browser 80 restricts which resources the embedded web components can access (i.e. the user can access). For example, most users should be unable to access media server 30's host file system or operating system. Therefore, all media element management, manipulation and generation is accomplished remotely from media server 30.

Authoring application 60 is preferably written in software such as Director™, with minimal necessary plug-ins. Authoring application 60 includes a configuration component, a communication component, a media element loading component and a user interface.

Authoring application 60 communicates with both browser 80, and media aggregator node 110 and TTS queue 90 in media server 30. In a preferred embodiment, authoring application 60 uses the internal HTTP loading abilities of a plug-in such as Shockwave™ to perform a remote procedure call communication to media aggregator 50 and TTS application 70, and to temporarily store media elements in its cache as it operates within browser 80. The loading of settings and content URLs is performed via HTTP POST upon startup of authoring application 60. Authentication is performed internally within the post. The returned media elements or multi-media narratives are parsed within authoring application 60 and seen by the user in browser 80.

Figure 4:
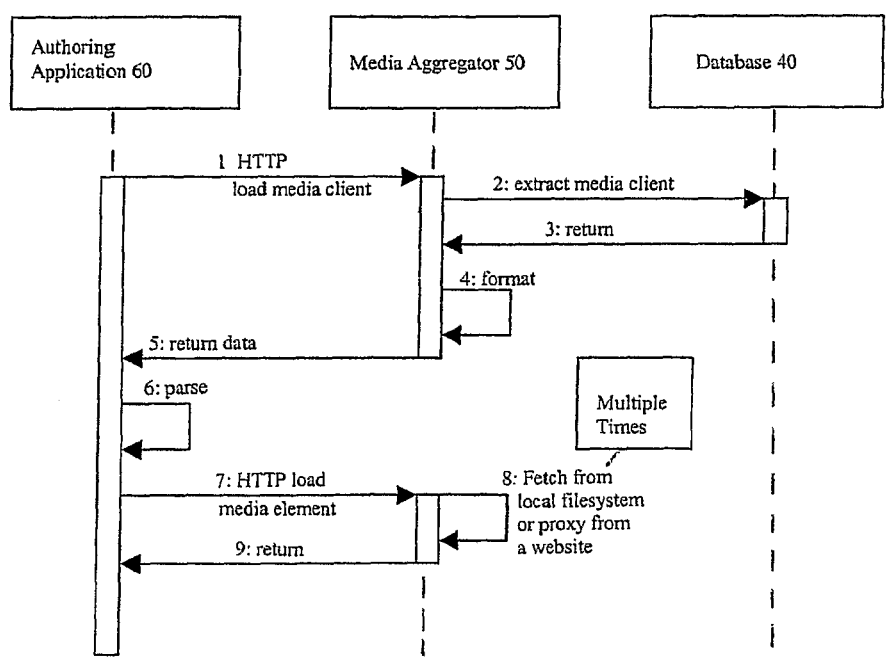
FIG. 4 is a diagram showing the communications between the media aggregator and the authoring application.

FIG. 4 shows the communication process between authoring application 60, media aggregator 50 and database 40. In the first step authoring application 60 sends a message to media aggregator 50 for a specific media element (step 1). Media aggregator 50 extracts the media element from media database 40 (step 2), and the media element is returned to media aggregator 50 (step 3). Media aggregator then formats the media element (step 4) and returns it to authoring application 60 (step 5), which will parse the element (step 6).

In the case authoring application 60 requires a media element available to the user, but not stored on database 40 (i.e. the media element is on another server), the load request is sent to media aggregator 50 (step 7), where the media element is fetched from a local file system or website (step 8) and then returned to authoring application 60 (step 9).

The media elements are preferably loaded via the standard HTTP GET protocol. If narration is created by the user, the text is offloaded to TTS application 70 on TTS server 100 via an HTTP request. The URL of the generated audio is then returned to authoring application 60. The saving of a resulting multi-media narrative is sent via HTTP POST to the media aggregator 50.

The media element is encoded in the HTTP commands, as is metadata associated with the element (such as captions and icons) and a description as to how the media elements are to be used.

Media Aggregator

Media aggregator 50 is based on media server 30 and functions as a server for authoring application 60 and browser 80. It performs the following functions: it stores media links for a user; it adds, retrieves, updates and deletes media links for a given user; it stores multi-media narrative data files created by a user in authoring application 60; and it performs proxying services for media elements not directly accessible by authoring application 60.

Media aggregator 50 accesses media database 40. Media database 40 is a conventional database, for example, a MySQL database, running on media server 30 (which in a preferred embodiment is a Sun Solaris X1 server, but other servers may be used). Database 40 is accessed via two software components: a collection manager 120, which is a multi-user web page based manager for managing a user's collected media elements; and an RPC style access layer for authoring application 60 users. In a preferred embodiment of the invention, both components are written in PHP 4.3.2 using object oriented code, but could be written in other languages. The code is run in process (such as mod_php4) in media server 30. Authoring application 60 stores and accesses links, text and authentication information (about a user) in database 40. Media elements are managed via collection manager 120. Preferably collection manager 120 is run on media server 30, but alternatively another server could be used. Collection manager 120 has an administration level area for managing user media element collections and managing media element files that reside on media server 30. Collection manager 120 also has a user-level area for managing the user's collection of media elements.

In an alternative embodiment, media aggregator 50 uses links to media element files that are on media server 30. Collections of media elements are built up as links between a user's media element collection and the local media element identifications. In this embodiment, links to media elements are posted to database 40 by users as they traverse the content of another web site (presumably at a separate server). These posts are provided to database 40 via HTTP connections when the user presses a "collect" button (or uses a right click menu option) while at the web site containing the selected media element. In a preferred embodiment, the system according to the invention accepts links to external media elements that can be accessed via a proxy. This proxy is necessary as authoring application 60 is a web application. Collection manager 120 handles this process.

Typically, browser security constraints limit authoring application 60 to making connections back to the server from which the authoring application 60 was downloaded. Hence, in a preferred embodiment, media elements are proxied from other servers. This is accomplished by URL translation proxying, in which the URL to the media element is re-encoded to provide authoring application 60 a location that is based on the same base URL as the server the authoring application 60 was downloaded from.

The Text-To-Speech Application

Figure 3:
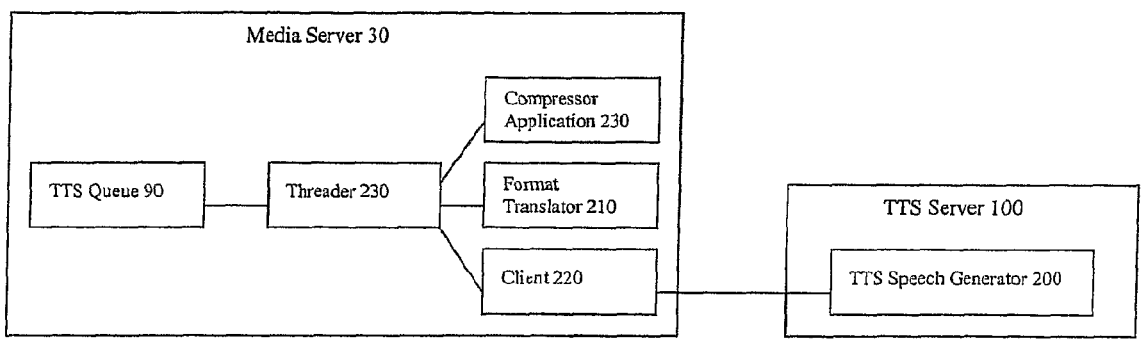
FIG. 3 is a block diagram showing an embodiment of the media server according to the invention

As seen in FIG. 3, TTS application 70 is preferably a collection of software components, one of which is TTS speech generator 200, such as that provided under the trademark ElanSpeech's Sayso Telecom, but other TTS speech generators may be used. A feature of TTS application 70 is that it can disseminate generated speech to software clients, such as authoring application 60, using the Internet.

TTS speech generator 200 outputs raw pulse-code-modulated (PCM) data (typically meant for telephony cards). Such data is too large for Internet delivery, and is in an unusable format for most browsers. This data is returned to client 220, and the data is converted by format translator 210 from raw pulse-code audio data into a format usable by authoring application 60. This data is then processed via compressor application 230 to reduce the data size and preferably to convert the file into MP3 (MPEG-2 Layer 3) format or the like.

TTS generator 200 creates the raw PCM data at the speed it would be naturally be spoken. Therefore, threader 230 manages the conversion and storage of the data to MP3 format as it is created on TTS server 100. In a preferred embodiment, faster-than real-time audio is produced, converted and stored in database 40 on media server 30 for transfer to authoring application 60. The resultant media element from TTS application 70 is connected to media aggregator 50 for management in the collection manager 120.

Speech generator 200 is preferably decoupled from threader 230, and the audio translation and compression pipelines to provide scalability. More TTS speech generators may be needed than processing servers as users are added.

Uses of the System

FIGS. 5 through 8 show the way in which a user can operate authoring application 60 to create a multi-media narrative. In the example shown in FIGS. 7 and 8, authoring application 60 is designed for use as an instructional tool, using the historical lessons about Samuel de Champlain and his first contact with the First Nations people of North America. Of course, this is purely an example and the system according to the invention can be used with media elements and multi-media narratives covering any topic.

Figure 7:
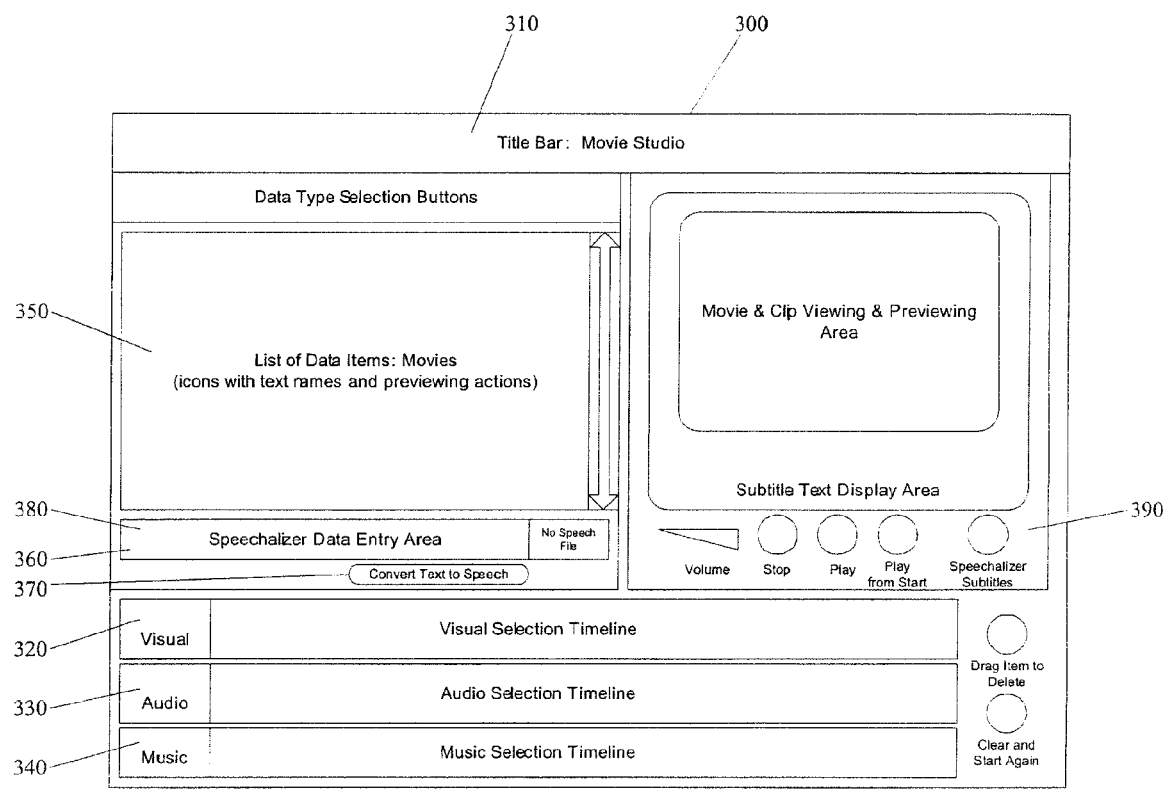
FIG. 7 is an embodiment of the appearance of the authoring application as seen by the user.
Figure 8:
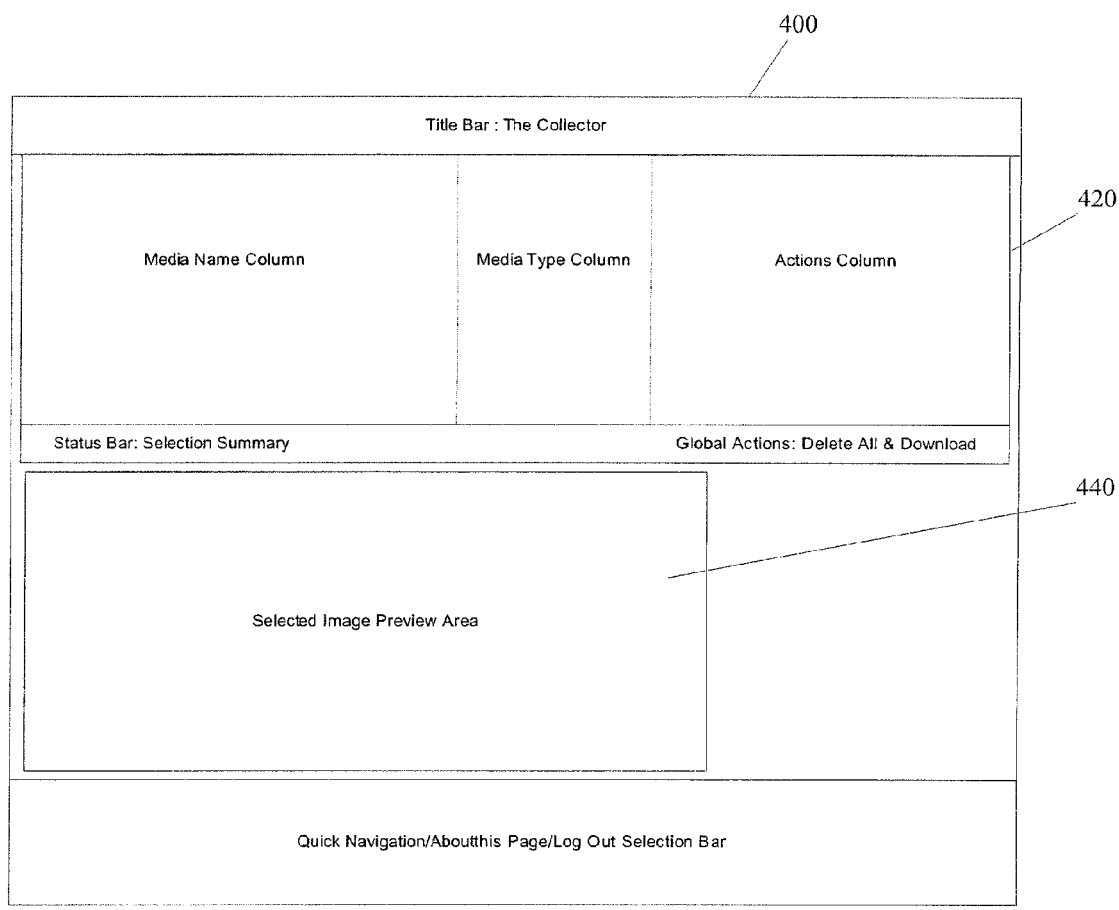
FIG. 8 is an embodiment of the appearance of the media aggregator as accessed by the user.

FIG. 7 displays an embodiment of a window 300 showing the authoring application as seen by the user in their browser 80. Title bar 310 shows the trade-mark associated with the product (in the example "MovieStudio") and the title of the particular tool for which authoring application 60 is being used (in this example, "First Contact"). This user interface can be easily "re-skinned" to provide a look-and-feel that matches the content's theme.

Visual bar 320, audio bar 330 and music bar 340 show the media elements of the multi-media narrative already selected in the order in which they will be presented. Each media element is represented graphically using an image which displays the time taken by such element. Media elements may be dragged to this bar from the "Clip Bin" 350 above, and may be dragged and dropped to reorder or remove media elements from the multi-media narrative. The bars 320, 330, 340 graphically show the overlap between visual media elements (moving images or stills) and audio or music media elements (which may overlap). Audio media elements may include sound effects or narration (possibly provided from TTS application 70).

TTS application 70 is accessed through the "Speechaliser" 360. Text may be entered by the user in space 380, who may then select the "Convert text to Speech" button 370. This causes an audio media element file to be placed adjacent to the space 380, which can then be "dragged" to clip bin 350 or audio bar 330.

Clip bin 350 is where media elements are shown in a graphical format so that they can be accessed by a user to add to the multi-media narrative. In a preferred embodiment of the invention, when the user first operates authoring application 60, clip bin 350 will already contain several media elements. The user can add media elements to the clip bin before loading the authoring application 60 by clicking on buttons or text links stating "Collect Item" when browsing a web page. These collected media elements are added to the user's list of media elements in media aggregator 50 which are stored in database 40. Upon loading the authoring application 60 an HTTP GET call is sent to the Media Aggregator 50 to determine if any additional media elements are to be added to the clip bin on initial loading of the authoring application 60.

Display tool 390 is used to show the multi-media narrative. While the media elements can be previewed in clip bin 350, the entire multi-media narrative is viewed in display tool 390. Furthermore, options may be available in display tool 390 to pause, stop and play the multi-media narrative, to show subtitles generated by the TTS application, and to adjust the volume of the narrative. Also, the user may add text here that will be displayed over the video media element.

Other features available include an options menu and a help menu. The user may save a completed multi-media narrative (it will be saved in database 40), and send a link to such multi-media narrative to others (if access is granted by the user), so that, for example, in an educational context, the multi-media narrative can be graded, or can be used in a presentation.

Figure 6:
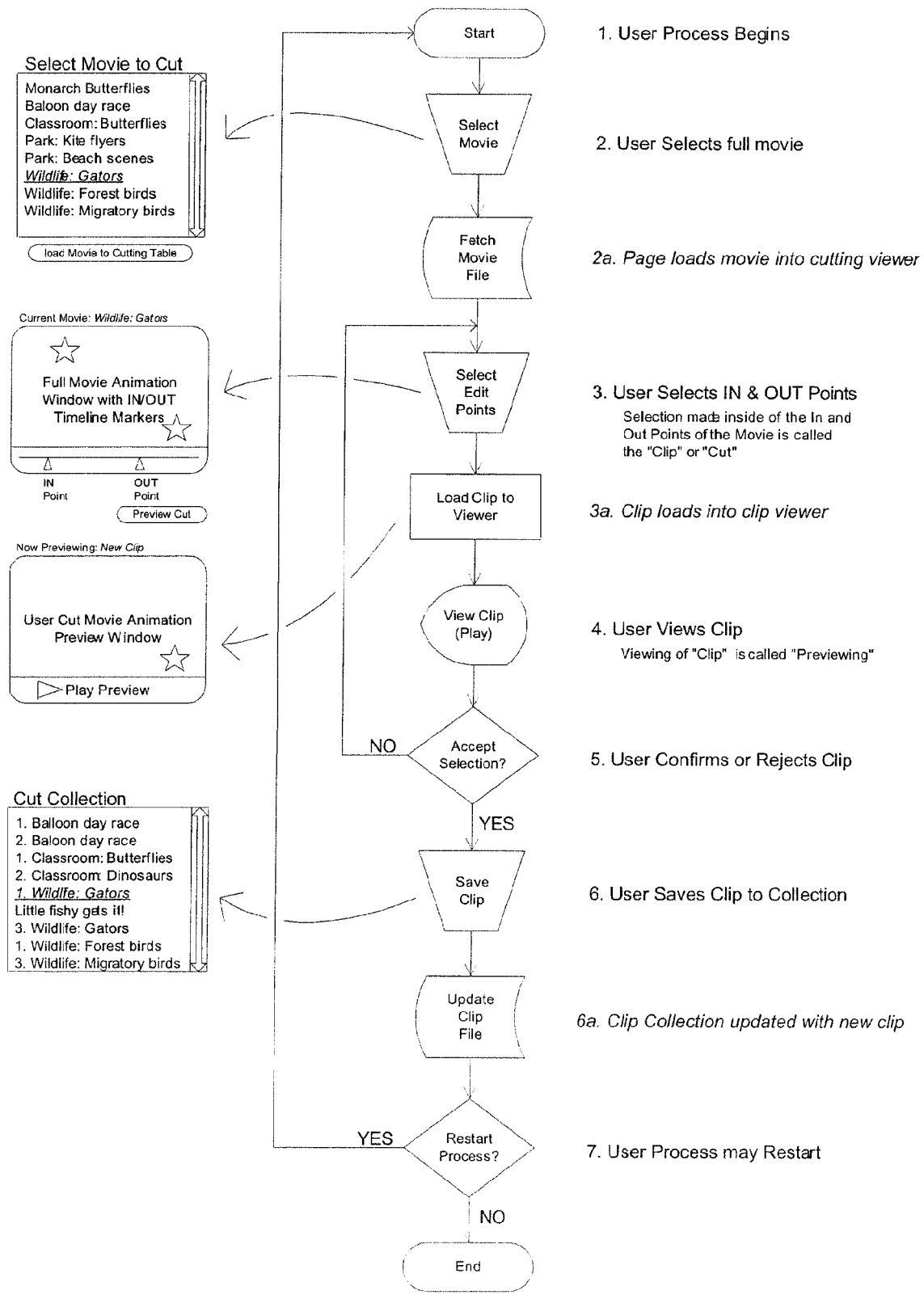
FIG. 6 is a flow chart showing the process by which a user cuts a multi-media narrative.

In an alternative embodiment, modification of media elements is possible using media editors. In this way media elements may be shortened, slowed down, or certain visual effects added. For example, FIG. 6 shows the schematic of a system allowing parsing of media elements. A media element is imported and a user can flag in and out points for the media element from within that imported media element, load the amended media element into the clip bin and then select the media element for use in the multi-media narrative.

From window 300, users can access the collection manager 120 using window 400. Window 400 allows the user to see all of the media elements they have collected and are available in the clip bin 350. Each media element is listed in media element list 420 showing the name of each of media element, the type of the media element (text, image, video, audio), and administrative actions, such as 'View', 'Delete', and 'Download'.

A user, by selecting the name of the object, or the 'View' option displays the media element below in viewing space 440. When the user selects 'Delete' the media element is removed from clip bin 350. If enabled by the content provider, selecting 'Download' provides the user a downloadable version of the media element for storage on the user's hard drive. In the example shown in FIG. 8, none of the listed media elements are available for download.

Typically, media elements are downloaded to the user's computer when displayed, but are stored in the caching system of authoring application 60, which is inaccessible to the user and which is automatically deleted upon exiting of browser 80 on computer 10. Therefore, media elements are not permanently stored on computer 10, but are stored in the cache as needed in order to play the media element or multi-media narrative in a real-time manner on computer 10. These media elements stored in the cache are not extractable. As such, if a content provider does wish to make it's media elements available for download by the user, such as graphics or text for a student's report or movies for a PowerPoint presentation, that content provider may flag the media elements on its server as downloadable and the user may activate the downloading of such media elements using collection manager 120.

Below each listing are two additional action buttons: 'Delete All,' and 'Download All' (if enabled by the content provider). Selecting 'Delete All' deletes all of the objects in the clip bin, and 'Download All' downloads everything.

The media server will allow users to collect media elements for use in their multi-media narratives. Such elements may be marked, for example with a button beside them having a Collector Icon and text that indicates the element is downloadable, for example by saying 'Collect this Item,' or 'Collect Movie'.

Once a media element is "collected" by the user, it is displayed, after the next launching of the authoring application 60, in clip bin 350, where the media element can be placed into the multi-media narrative by the user. In a preferred embodiment only users offering proper credentials (for example user ID and password) are able to collect media elements. In such an embodiment, users must login with a user ID in order to obtain a collection of media elements. Collected media elements are stored in database 40 in association with the user's profile. If authoring application 60 does not require a user ID, it is preferably usable only with pre-populated media elements, and the collection option may not be available.

Figure 5:
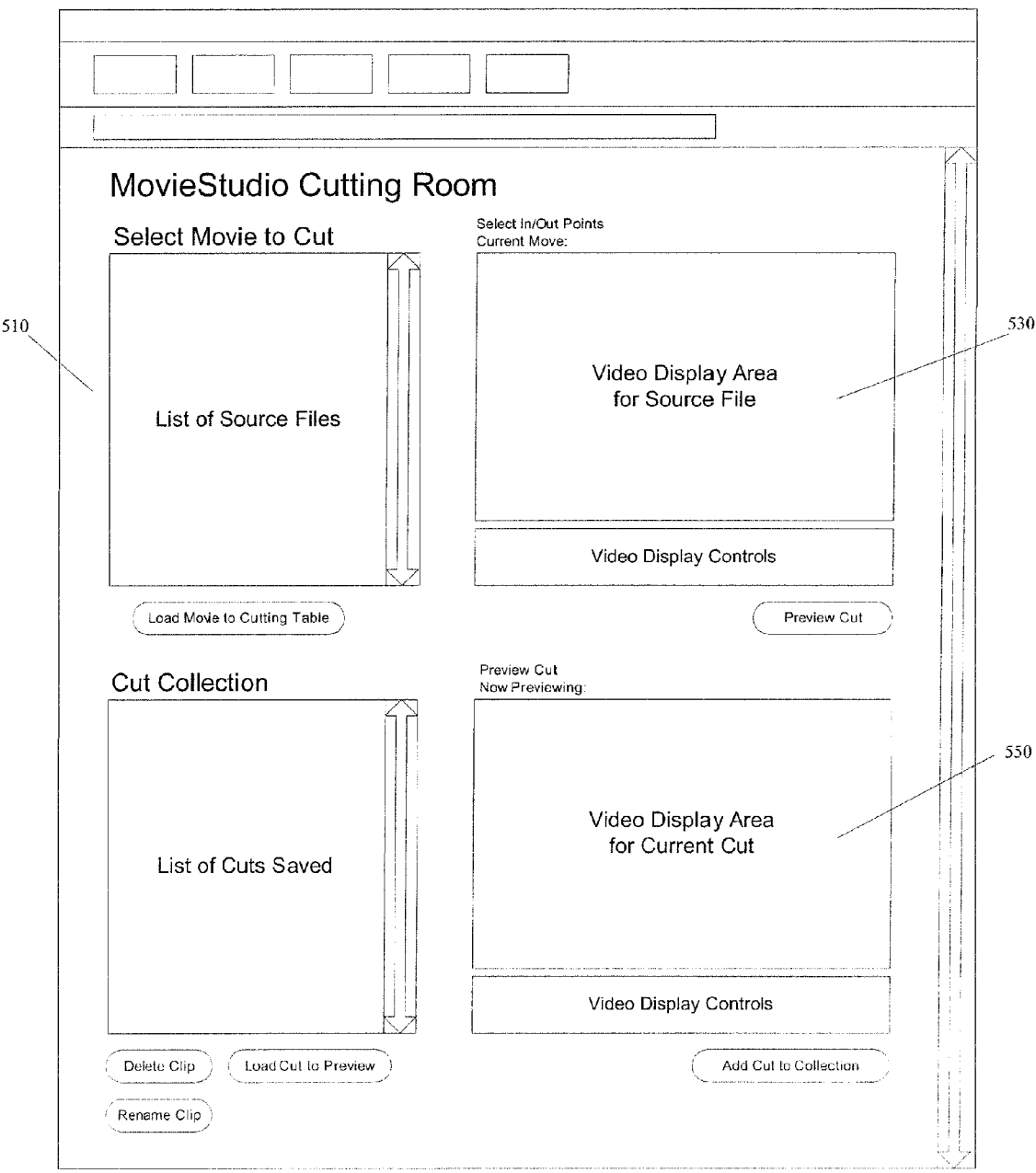
FIG. 5 is a view of an embodiment of the preview option as seen in the user's browser.

FIGS. 5 and 6 show how a user can edit a multi-media narrative (in this example a movie) using authoring application 60. Users can load the server 30 based narratives into authoring application 60 through media aggregator 50 and then to clip bin 350, or alternatively directly to clip bin 350. As seen in FIG. 5, the user is presented a list of multi-media narratives 510 (referred to as "Movies" in this example). These multi-media narratives can be viewed in viewer 530. The user can then flag in and out points within that multi-media narrative for insertion of a media element, loads the media element into a viewer and then saves the media element to collection for use in the multi-media narrative. Preferably, this can be done with any multi-media narrative found on the Internet.

FIG. 6 shows an embodiment of the process from the user's perspective. In step 1, the user begins the cutting process. In step 2, the user's list 510 contains multi-media narratives for selection by the user (step 3). In step 2*a* the selected multi-media narrative is loaded into the viewer 530. In the example shown, the user has selected a multi-media narrative entitled "Wildlife: Gators". The user then selects in and out points (step 3*a*) for a new media element using authoring system 60 and a media element for placement. The new multi-media narrative (referred to as a "cut clip") is loaded into the "preview cut" viewer 550 (step 3*b*). The user can then view the new multi-media narrative (step 4) and confirm acceptance or rejection of the new cut of the multi-media narrative (step 5). If the new cut is rejected, the user can repeat the process by selecting new in and out points (step 3).

If the new multi-media narrative is confirmed, the narrative is saved to the user's collection (step 6), which replaces the previous multi-media narrative with the new. The user can then restart the process at his or her leisure (step 7).

The user can also use the preceding process to delete media elements (or portions thereof) from multi-media narratives.

Therefore, the system according to the invention allows users to make the following actions:

1. Users can access a web page and start creating their own multi-media narratives, such as movies.
2. Users can collect media elements from web sites and use those media element in their multi-media narratives, without using computer 10's hard-drive.
3. The authoring application 60 allows narrative text, either typed in, or collected as text from a website, be converted into audible speech and used in a multi-media narrative.

Furthermore, preferably TTS application 70 is a general system that can be used to provide narrative audio to software agents on the Internet.

The method or system described above may be implemented by a computer-readable medium having recorded thereon statements and instructions for execution by a computer to carry out the method. Furthermore, the method may be implemented by a computer program product, comprising a memory having computer readable code embodied therein for execution by a CPU. In yet another embodiment, the method according to the invention may be implemented as a carrier wave embodying a computer data signal representing sequences of statements and instructions which, when executed by a processor cause the processor to perform the method.

Although the particular preferred embodiments of the invention have been disclosed in detail for illustrative purposes, it will be recognized that variations or modifications of the disclosed apparatus lie within the scope of the present invention.

The invention claimed is:

1. A method for a user to edit a movie, comprising:
    (a) generating an audio media element from text provided by the user and a voice selected by the user;
    (b) storing the audio media element on the server for selection by the user;
    (c) using a browser, selecting the audio media element on the server for inclusion in the movie; said audio media element associated with a download flag; said audio media element stored in a cache of said browser, unavailable for saving by said user when the download flag is not set by a content provider and available for download by said user when the download flag is set by the content provider; the audio media element represented to the user as a image displaying the time taken by the audio media element;
    (d) selecting a position within said movie to position said audio media element;
    (e) inserting said audio media element within said movie by placing the audio media element on an audio bar of the movie;
    (f) using the browser, selecting a video media element on a server for inclusion in the movie; said video media element associated with a separate download flag; said video media element stored in a cache of said browser, unavailable for saving by said user when the download flag is not set by a content provider and available for download by said user when the download flag is set by the content provider; the video media element represented to the user as a image displaying the time taken by the video media element;
    (g) selecting a position within said movie to position said video media element; and
    (h) inserting said video media element within said movie by placing the video media element on a visual bar of the movie,
    wherein during steps (c) through (h) said visual bar and said audio bar are both displayed to said user and said visual bar is aligned with said audio bar to display overlap between video media elements on said visual bar with audio media elements on said audio bar.

2. The method of claim 1 wherein said movie is stored on said server, and when displayed in said browser, is stored in said cache of said browser, inaccessible to said user.

3. The method of claim 2 wherein said audio media element is generated from text provided by the user and a voice selected by the user, said audio media element, after generation, being stored on said server for selection by said user.

4. The method of claim 3 wherein said movie, including said audio and video media elements, is displayed within said browser after said audio and video media elements are inserted within said movie.

5. The method of claim 4 wherein said audio and video media elements are selected from a list of media elements within said browser.

6. The method of claim 5 wherein said user selects a plurality of media elements for said list of media elements, at least a portion of said plurality of media elements stored on a second server.

7. A system for editing a movie comprising:
    a) a text to speech converter for converting text input into an audio media element, and
    b) an authoring application for inserting the audio media element within the movie; said
    authoring application executable within a browser; said audio media element associated with a download flag; said audio media element stored within a cache of said browser, unavailable for saving by a user of said browser when the download flag is not set by a content provider and available for download by said user when the download flag is set by the content provider; said audio media element represented as an image displaying the time taken to play the audio media element; said audio media element insertable, by the user, in an audio or visual bar; wherein said visual bar is aligned with said audio bar to display audio overlap between media elements on said visual bar with media elements on said audio bar, and when using said authoring application, said visual bar and said audio bar are both displayed;
    c) a database on a server for storage of said audio media element and said movie; and
    d) a media aggregator for retrieving stored media elements from said server for said authoring application, said media aggregator formatting said media elements for said authoring application.

8. The system of claim 7 further comprising a collection manager for managing a plurality of media elements.

9. The system of claim 8 wherein the movie, when played within said browser, is stored in a cache of said browser, inaccessible to the user.

10. The method of claim 1 further comprising:
    (d. 1) shortening the duration of the video media element.

11. The method of claim 1 further comprising:
    (d. 1) shortening the duration of the audio media element.

12. The system of claim 7, further comprising:
    d. a media editor for editing the audio media element prior to inclusion in the movie.

13. The system of claim 8 wherein said collection manager allows user to collect links to media elements, and post said links to said database.

14. The system of claim 13 wherein said media elements are accessed via a proxy server.

15. The system of claim 12 further comprising a music bar in which audio media elements are insertable, said music bar aligned with said audio bar and said visual bar.

16. The system of claim 13 wherein said authoring application displays to a user, said music bar, said audio bar and said visual bar; said database, from which said user may select media elements, and said movie, which said user may view.

17. The system of claim 1 wherein said user is presented with a display containing said media elements for insertion, and said movie, simultaneously.

18. The system of claim 17 wherein said user is further presented with a music bar aligned with said visual bar and said audio bar, into which said audio media elements are insertable.

19. The system of claim 18, wherein said user may view a media element before insertion into one of said bars.

20. The system of claim 19 wherein said user may stop, pause, fast-forward or play said movie.

21. The system of claim 7 wherein said media element generated by said text to speech converter is in a voice selectable by said user.

\* \* \* \* \*